United States Patent Office 3,662,038
Patented May 9, 1972

3,662,038
PROCESS COMPRISING REACTION WITH
ELEMENTAL PHOSPHORUS
Chisung Wu, North Brunswick, N.J., assignor to Union
Carbide Corporation, New York, N.Y.
No Drawing. Original application Feb. 15, 1966, Ser. No.
527,492. Divided and this application May 21, 1969,
Ser. No. 826,714
Int. Cl. C07f 9/02, 9/28, 9/40
U.S. Cl. 260—985                                    5 Claims

ABSTRACT OF THE DISCLOSURE

Process which comprises reacting (a) elemental phosphorus, (b) an epoxide or an episulfide, and (c) an alcohol or a mercaptan, in the presence of a catalytic quantity of a base, further reacting the product with an activated olefin to add said olefin to substantially all of the P—M moieties present in said product and thereafter oxidizing the resultant product to convert substantially all trivalent phosphorus in said reactant products to pentavalent phosphorus.

---

This application is a division of application Ser. No. 527,492, filed Feb. 15, 1966 now abandoned.

The invention relates to a process for producing organophosphorus compositions, to the compositions produced by said process, and to various derivatives thereof. In one aspect, the invention relates to a process which comprises reacting elemental phosphorus, an alcohol or mercaptan, and an epoxide or episulfide, in the presence of a basic catalyst. In another aspect, the invention relates to the organophosphorus compositions that are produced by the process of the invention, and to various derivatives thereof.

The process of the invention comprises reacting elemental phosphorus with an alcohol or mercaptan and an epoxide or episulfide in the presence of a basic catalyst to produce thereby an organophosphorus composition.

Elemental phosphorus is employed in the invention. White or yellow phosphorus is preferred, although the less reactive red or black phosphorus can be used if desired.

The second reactant that is employed is an alcohol or a mercaptan. Any alcohol or mercaptan that is free of substituents that can destroy or deactivate the base catalyst under the reaction conditions employed can be used in the invention. Thus, the following classes of alcohols and mercaptans can be employed in the invention:

Hydroxyl- and mercapto-substituted alkanes and cycloalkanes such as methanol, ethanol, isopropyl alcohol, n-butanol, pentanol, hexanol, cyclopentanol, cyclohexanol, 2-ethylhexanol, isodecanol, lauryl alcohol, stearyl alcohol, ethylene glycol, propylene glycol, butylene glycol, glycerol, 1,2,6 - hexanetriol, pentaerythritol, xylitol, sorbitol, 1,1,1-trimethylolethane, 1,1,1-trimethylolpropane, methyl mercaptan, butyl mercaptan, 1,2-dithiol-3-hydroxypropane, and the like.

A second desirable class of alcohols are the hydroxyethers including alkylene oxide adducts of active hydrogen-containing compounds. Illustrative of such alkylene oxide adducts are diethylene glycol, triethylene glycol, dipropylene glycol, dibutylene glycol, polyoxypropylene glycols, polyoxyethylene glycols, mixed polyoxyethylene-polyoxypropylene glycols, polyoxybutylene glycols including polytetramethyleneoxy glycols, propylene oxide adducts of glycerol, and other ethylene oxide, propylene oxide, or butylene oxide adducts of water, methanol, ethanol, isopropyl alcohol, n-butanol, phenol and alkylphenols, ethylene glycol, propylene glycol, butylene glycol, hydroquinone, glycerol, pentaerythritol, ammonia, alkanolamines, alkylamines, aniline, adipic acid, phthalic acid, and the like. The hydroxyethers are organic compounds having at least one alcoholic hydroxyl group and at least one ether group, and which preferably contain no non-hydrocarbon substituents other than ether oxygen, hydroxyl groups, amino groups (usually tertiary amino groups), carbonyl groups, and carbonyloxy groups. The hydroxyether can be a composition having a very high molecular weight, for instance, up to about 10,000 or more, although preferably the molecular weight will be below about 5000 and more preferably below about 3500.

A third desirable class of alcohols are aminoalcohols. Illustrative of such alcohols are triethanolamine, triisopropanolamine, tributanolamine, N-methyldiethanolamine, N,N-dimethylethanolamine, N-methyldiisopropanolamine, N,N-dimethylisopropanolamine, N-ethyldiethanolamine, N-phenyldiethanolamine, and the like. The preferred aminoalcohols are the N-methyldialkanolamines and the N,N-dimethylalkanolamines.

In addition, many other alcohols can be employed including alcohols that contain olefinic unsaturation such as allyl alcohol, oleyl alcohol, linoleyl alcohol, linolenyl alcohol, and the like. The alcohol that is employed can thus be selected from many classes of compounds provided that the alcohol is substantially free of groups that would interfere with the reaction. Such groups to be avoided include carboxylic acid groups, phenolic hydroxyl, halo, and others that would neutralize or substantially weaken the basic catalyst.

The third reactant that is employed in the process of the invention is an epoxide or an episulfide. Epoxyalkanes are particularly useful, illustrative examples of which include ethylene oxide, propylene oxide, butylene oxide, epoxyhexane, epoxycyclohexane, epoxydecane, and the like. Also, epithioalkanes are useful, for example, ethylene sulfide, propylene sulfide, and the like, can be employed.

Epoxyalcohols can be employed in the process of the invention as the sole reactant with the elemental phosphorus, thereby supplying the epoxy and the alcohol function in a single compound. Among the useful expoxyalcohols that can be employed are 4-oxatetracyclo-[6.2.1.0$^{2,7}$.0$^{3,5}$]undecan-9(10)-ol, glycidol, and the like.

Other types of epoxides can be employed in the invention, including polyepoxides, aminoepoxides, epoxides containing olefinic unsaturation, ester groups, ether groups, and the like. Specific illustrative examples include vinylcyclohexene dioxide, vinylcyclohexene monoxide, N-glycidyl diethylamine, epoxidized soybean oil and other such oils, the diglycidyl diether of 2,2-bis(para-hydroxyphenyl) propane, 3,4-epoxycyclohexylmethyl 3,4-epoxycyclohexanecarboxylate, bis(2,3-epoxycyclopentyl) ether, and the like.

The alkylene oxides (i.e., epoxyalkanes) are the preferred epoxides, although for certain specialty applications other epoxides are highly useful.

The proportion of the reactants can vary widely. For example, the proportion of epoxide plus alcohol to phosphorus can vary from about 0.1 to about 10, and preferably from about 0.3 to about 3, gram-equivalents of epoxide plus alcohol per gram-atom of phosphorus. The ratio of alcohol to epoxide can vary widely, for example, from about 0.1 to about 10, and preferably from about 0.3 to about 3, equivalents of alcohol per equivalent of epoxide.

A base catalyst is employed in the invention. Alkali metal and alkaline earth metal bases are useful. Examples include sodium hydroxide, potassium hydroxide, lithium hydroxide, calcium hydroxide, magnesium hydroxide, barium hydroxide, sodium metal, potassium metal (the alkali metals will form alkali metal alcoholates in situ), potassium carbonate, sodium ethoxide, magnesium methoxide, and the like. Of the alkali and alkaline earth metal base catalysts, the preferred are the alkali metal alcoholates formed in situ by reaction of alkali metal with the alcohol reactant. Quaternary ammonium bases are highly desirable catalysts for use in the invention. Quaternary ammonium bases can be generated in situ by the interaction of an N,N-dimethylamine and an epoxide, as is illustrated by the quaternary ammonium compound formed by the reaction of N,N-dimethylamine or N,N-dimethylethanolamine with ethylene oxide or propylene oxide. Other useful quaternary ammonium bases include trimethyl-2-hydroxyethyl ammonium hydroxide or alkoxides (which are formed by reaction of aqueous or alcoholic trimethylamine with ethylene oxide), trimethylbenzyl ammonium hydroixed or alkoxide, and the like.

The base catalyst is employed in catalytically significant quantities. The actual amount can vary widely since the catalyst can be employed in very small amounts or the catalyst can actually be one of the reactants. Thus, the catalyst can be employed in amounts of from about 0.01 mole percent to about 10 mole percent, and more preferably from about 0.1 to 6 mole percent, based on gram-atoms of phosphorus present in the reaction mixture.

The process of the invention is carried out by contacting the reactants in a suitable reaction vessel. The order of addition is not critical. The reaction temperature can vary widely, for instance, elevated temperatures of from about 25° C. to about 200° C. are suitable, and temperatures of from about 44° C. (the melting point of white phosphorus) to about 150° C. are preferred. The reaction is carried out for a period of time sufficient to produce an organophosphorus composition. For instance, reaction times of from about 10 minutes to about 10 hours are suitable, depending upon temperature, nature of the reactants, and the like. If desired, an inert organic diluent can be employed for the reaction. Suitable diluents include toluene, methyl isobutyl ketone, dioxane, dimethyl sulfoxide, N,N-dimethylformamide, and the like. It is usually desirable to blanket the reaction mixture with an inert atmosphere such as nitrogen.

Standard procedures can be employed to recover the product. For instance, a convenient method is to first neutralize the catalyst, then filter and evaporate the product under vacuum to remove unreacted starting material, solvents, and the like.

The invention also provides novel organophosphorus compositions that are produced by the process of the invention. The novel compositions are usually mixtures of compounds that can be represented by Formula I:

(I)         $(RX)_{3-n}P(R^1)_n$ wherein $n$ is a number having a value of from 1 to 2, wherein X is oxy or thio, wherein R represents the residue after removal of the hydroxyl group of an alcohol or the sulfhydryl group of a mercaptan, and wherein $R^1$ represents hydrogen, —$R^2XH$ or —$R^2XP(R^1)_m(XR)_{2-m}$ wherein $m$ represents a number having a value of from 0 to 2, wherein $R^2$ represents the residue after removal of the epoxy group of an epoxide, and wherein X, R, and $R^1$ are as defined above. The compounds represented by Formula I can be relatively simple compounds having only one or two phosphorus atoms, or they can be relatively high molecular weight materials having up to ten or more phosphorus atoms.

Representative examples of organophosphorus compositions that are within the scope of Formula I are the following:

(a)         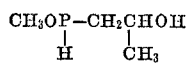

(b)         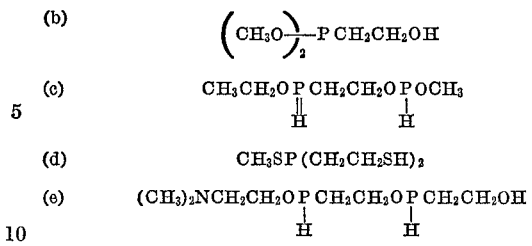

(c)         CH₃CH₂O P CH₂CH₂O POCH₃
              ‖           ‖
              H           H (d)         CH₃SP(CH₂CH₂SH)₂

(e)         (CH₃)₂NCH₂CH₂O P CH₂CH₂O P CH₂CH₂OH
                           |             |
                           H             H

Formula I includes the organophosphorus compositions formed by reacting elemental phosphorus with a monohydric alcohol and a monoepoxide. More complex compositions can be formed when polyhydric alcohols and/or polyepoxides are employed. For example, among the compounds that can be formed by reacting an alkylene or polyalkylene glycol, phosphorus, and an alkylene oxide are the following:

(f)         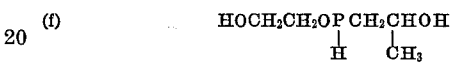

(this compound is within the scope of Formula I)

(g)         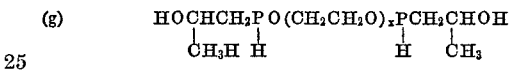

wherein $x$ is 1 or more.

The complex nature of the organophosphorus compositions of the invention is apparent from the foregoing discussion. Said compositions contain P—H, P—C, and P—X—C groupings in varying proportions that depend to a limited extent, on the proportion of the reactants. For instance, a greater proportion of epoxide or episulfide compared with alcohol or mercaptan will generally increase the proportion of P—C groups over P—X—C groups. A relatively large proportion of alcohol or mercaptan in the reaction mixture will result in an increase in P—H groups.

The organophosphorus compositions of the invention are useful materials, particularly as reaction intermediates. For example, the compositions can be oxidized under mild conditions to convert the P—H groups to P(O)OH groups which can be neutralized with alkylene oxide to form a useful polyol. Such polyols can be employed as epoxy resin hardeners, as coating intermediates after esterification with drying oil acids, and the like.

In one desirable embodiment of the invention, the organophosphorus compositions described above are reacted with an aldehyde in order to convert substantially all of the phosphinous hydrogen (i.e., hydrogen bonded directly to phosphorus) to hydroxymethyl (including substituted hydroxymethyl) groups. Many aliphatic and aromatic aldehydes can be employed for this purpose including formaldehyde, acetaldehyde, propionaldehyde, isobutyraldehyde, benzaldehyde, and the like. Formaldehyde is highly preferred. The aldehyde addition reaction is carried out simply by adding the aldehyde to the organophosphorus compositions and contacting until substantially all of the phosphinous hydrogen has been converted to hydroxymethyl groups in accordance with the reaction:

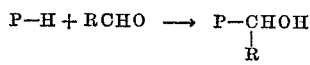

wherein R represents hydrogen or an aliphatic or aromatic group. This reaction, which is usually exothermic, will take place at room temperature, although higher or lower temperatures (for example, from 20° C. to the boiling point of the aldehyde) can be employed if desired. At room temperature, the aldehyde addition reaction usually takes from about 0.1 to about 6 hours, after which the product can be recovered by vacuum evaporation of excess aldehyde. The aldehyde is preferably employed in proportions slightly in excess of the amount needed to react with all of the phosphinous hydrogen. The aldehyde-modified composition can subsequently be oxidized (under mild conditions such as by warming in air) to convert the organophosphorus groups to organophosphorus oxide groups, e.g., in accordance with the reaction:

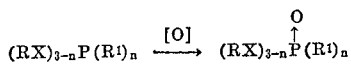

wherein the variables are as identified above with respect to Formula I (modified to the extent that phosphinous hydrogen is replaced with hydroxymethyl). Such oxidation has the effect of converting trivalent phosphorus to pentavalent phosphorus.

The reaction of aldehyde with phosphinous hydrogen to form hydroxymethyl groups and the oxidation reaction discussed above are both well known types of reactions. The aldehyde-modified compositions per se and their oxidized derivatives are polyols having wide utility. For instance, these polyols can be modified by adding ethylene oxide to form useful surfactants, they can be employed as epoxy resin hardeners, they can be esterified with drying oil acids to form surface coating compositions, and the like.

Another desirable embodiment of the invention resides in the reaction of the organophosphorus compositions of the invention with an activated olefin. An activated olefin will add to the P—H group, as is illustrated by the reaction:

wherein $R^3$ represents a strongly electronegative group. Examples of activated olefins include acrylonitrile, acrylamide, methyl acrylate, t-butyl methacrylate, vinyl methyl ketone, vinyl methyl sulfone, and the like. The reaction conditions employed for the addition of activated olefin are essentially the same as those used for the aldehyde addition. The reaction is usually exothermic and requires no catalysts.

The compositions to which an activated olefin have been added can be oxidized under essentially the same conditions indicated above with respect to the aldehyde-modified materials.

The activated olefin-modified compositions (both per se and the oxidized derivatives thereof) are widely useful materials. They can be employed as flame-retardant additives for various polymeric systems including phenolic and epoxy resins. They are useful as anti-static agents for thermoplastic polymers, as oil additives, as sequestrants, and the like.

A further desirable embodiment of the invention resides in urethane polymers produced by reacting an organic polyisocyanate with a polyol comprising the organophosphorus compositions of the invention and/or the various derivatives thereof, in particular, the aldehyde-modified compositions.

The organic polyisocyanates which can be employed to produce the urethane polymers include tolylene diisocyanate, bis(4-isocyanatophenyl)methane, the polyisocyanates formed by phosgenation of aniline/formaldehyde condensation products, bis(2-isocyanatoethyl)fumarate, xylylene diisocyanate, and many other organic polyisocyanates that are well known in the art.

It may be desired to employ one or more additional polyols along with the phosphorus-containing polyols of the invention. Such additional polyols include polyesters, polyethers, polylactones and the like. Specific illustrative examples include polyethers comprising alkylene oxide (especially ethylene oxide, propylene oxide, or butylene oxide) adducts of glycerol, water, dipropylene glycol, ammonia, 1,2,6-hexanetriol, 1,1,1-trimethylolpropane, sorbitol, alpha-methyl glucoside, sucrose, aniline-formaldehyde condensation products, phenol-aniline-formaldehyde consation products, and the like. Useful polyesters include reaction products of ethylene glycol, propylene glycol, glycerol, 1,1,1-trimethylolpropane, or the like with adipic acid, phthalic acid, or the like. Lactone polymers include homopolymers of epsilon-caprolactone and copolymers of alkylene oxides and epsilon-caprolactone, and the like.

The polyol or polyol mixture employed will be selected according to the end product desired. For example, for flexible foams, a polyol having an average hydroxyl number of from about 40 to 70 is desired, for semi-flexible foams or for rigid foams, polyols having average hydroxyl numbers of from about 70 to 150 or from about 125 to 7000, respectively, are useful.

The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
$f$ = average functionality, that is average number of hydroxyl groups per molecule of polyol
M.W. = average molecular weight of the polyol The urethane polymers of the invention can take the form of foamed products, elastomers, surface coatings, castings and the like. The foamed products can be produced by the one-shot technique wherein all of the reactants are reacted simultaneously with the foaming operation, by the prepolymer technique, or by the quasi-prepolymer technique, all of which are well known in the art. In producing elastomers and castings, the prepolymer technique is useful. In the prepolymer technique, the isocyanate is reacted with a slightly less than stoichiometric quantity of polyol to produce a prepolymer having a low percentage (e.g., from 4 to 10 percent) of free —NCO groups. The prepolymer is subsequently converted into an elastomer by reacting with a cross-linking agent having reactive hydrogen atoms such as a diamine, for instance, a bis(aminochlorophenyl)methane. In producing surface coatings, there are several types of known reaction techniques which can be employed.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of about 1.0 to 1.2 equivalents of —NCO per equivalent of active hydrogen, and preferably a ratio of about 1.05 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, and the like.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds.

Among the most useful catalysts are the tertiary amines and the organic tin compounds. Specific illustrative tertiary amines include N-methylmorpholine, N,N,N',N'-tetramethyl-1,3-butanediamine, 1,4-diazabicyclo[2.2.2]octane, bis[2 - (N,N - dimethylamino)ethyl]ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

the phosphorus was consumed completely, leaving a viscous, colorless liquid having a phosphine odor.

EXAMPLES 2–12

Potassium alkoxide catalyzed reaction of phosphorus with alcohol-epoxide mixtures Various combinations of alcohols and epoxides were reacted with white phosphorus under the conditions summarized in Table I. A catalytic amount of potassium metal was added at room temperature to the alcohol or to the reaction mixture, and then the reaction mixture was heated to reflux while vigorously stirred under nitrogen. When phosphorus was completely consumed, the reaction mixture was evaporated under vacuum (0.5 mm. Hg) at 40–50° C. to constant weight.

TABLE I

| Example number | Alcohol | Mol [a] | Epoxide | Mol [a] | K, percent [b] | Reaction Temp., °C. | Time, hr. |
|---|---|---|---|---|---|---|---|
| 2 | n-Propanol | 1.0 | Propylene oxide | 1.7 | 2.5 | 42–46 | 1 |
| 3 | Propylene glycol | 1.5 | 1,2-butylene oxide | 1.5 | 5 | 56–112 | 2 |
| 4 | n-Butanol | 1.5 | Propylene oxide | 2 | 5 | 42–53 | 1 |
| 5 | Sec-butanol | 1.5 | ...do | 2 | 5 | 47–55 | 1 |
| 6 | n-Dodecanol | 1.5 | ...do | 2 | 5 | 47–61 | 2.5 |
| 7 | n-Propanol | 1 | Epoxide A [c] | 1.25 | 2.5 | 50–125 | 0.2 |
| 8 | | | Epoxide B [d] | 2 | 2.5 | 80–140 | 1 |
| 9 | n-Propanol | 2 | Aminoepoxide [e] | 2 | 2.5 | 54–75 | 1.2 |
| 10 | ...do | 2 | Epoxide C [f] | 2 | 5 | 53–57 | 1 |
| 11 | Aminoalcohol [g] | 2 | Propylene oxide | 2 | 5 | 45–61 | 0.6 |
| 12 | Ethanol | 5 | ...do | 2.5 | [h] 10 | 46–66 | 2.5 |

[a] Based on one g. atom of P.
[b] G. atom percent of P.
[c] Vinylcyclohexene dioxide.
[d] 4-oxatetracyclo[6.2.1.0²,⁷.0³,⁵]undecan-9(10)-ol.
[e] N-Glycidyl diethylamine.
[f] Vinylcyclohexene monoxide.
[g] N,N-Dimethyl ethanolamine.
[h] Sodium metal.

When producing urethane foams, it is useful in most cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Pats. 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunder and Frisch, "Polyurethanes: Chemistry and Technology," Interscience Publishers, New York. Part I, "Chemistry," was published in 1963 and Part II, "Technology," in 1964.

The urethane polymers of the invention have wide utility. For instance, they can be employed as elastomers, rigid and flexible foams, coatings, and the like. The wide utility as gaskets, sealers, in insulation, cushions and padding, in paints, and the like, of such urethane polymers is well known.

The examples which follow illustrate the invention.

EXAMPLE 1

Potassium alkoxide catalyzed reaction of phosphorus with propylene oxide and propylene glycol To a 500-ml. four-necked flask equipped with a stirrer, thermometer, Dry Ice-acetone condenser, and a dropping funnel were charged 6.2 gm. of yellow phosphorus and 70 gm. of propylene glycol. The mixture was heated to 50° C. under a nitrogen atmosphere, and then cooled gradually with vigorous agitation to prepare phosphorus sand. To the mixture was added 35 gm. of propylene oxide, and 0.24 gm. of potassium dissolved in 12 gm. of propylene glycol. After heating for 5 hours at 35–50° C.,

EXAMPLE 13

Potassium mercaptide catalyzed reaction of phosphorus with n-butyl mercaptan and propylene oxide About 0.5 gm. of yellow phosphorus and 5 ml. of propylene oxide were added to a test tube containing about 5 ml. of n-butyl mercaptan in which 0.05 gm. of potassium metal had been dissolved. Upon warming, the reaction mixture turned deep red. The color faded when the phosphorus was consumed. The colorless solution was added to another test tube containing same reactants except potassium. Again the red color formation was observed at room temperature, and upon warming phosphorus was consumed.

EXAMPLE 14

Reaction of phosphorus with N,N-dimethylethanolamine (DMEA) and propylene oxide or ethylene oxide A mixture of 6.2 gm. of yellow phosphorus, 23 gm. of propylene oxide and 28 gm. of N,N-dimethylethanolamine was heated to 45° C. whereupon the reaction mixture turned to dark red with heat evolution. The color faded and the phosphorus was completely consumed in about 20 minutes. After evaporation, there was obtained 50 gm. of a yellow, viscous liquid with a phosphorus content of 11.61%, corresponding to 95% yield based on phosphorus.

Similar results were obtained with ethylene oxide except that a longer reaction time was required due to the lower reflux temperature of the reaction mixture.

EXAMPLE 15

DMEA-catalyzed reaction of phosphorus with methanol and propylene oxide

A mixture of 6.2 gm. of yellow phosphorus, 2 ml. of propylene oxide, and 0.9 gm. of N,N-dimethylethanolamine was heated to 45° C. To the resulting red molten mixture was added dropwise a mixture of 11.6 gm. of propylene oxide and 12.8 gm. of methanol. Phosphorus was completely consumed after 0.5 hour at 45–75° C. Evaporation of the reaction mixture gave 18 gm. of a light yellow, water-insoluble, viscous liquid containing 27% P.

EXAMPLE 16

Formaldehyde derivative of the product from Example 15

The product from Example 15 was treated with 16 ml. of 37% aqueous formaldehyde and then with 6 ml. of 30% hydrogen peroxide. After evaporation of the reaction mixture, there was obtained a colorless viscous liquid having 18.76% P.

In another experiment, the formaldehyde-modified product was oxidized by air until the silver nitrate test for the PH bond was negative. After evaporation to constant weight, the product was further treated with propylene oxide until the acid number was about 3. The final product had a phosphorus content of 17%, corresponding to an overall yield of 95% based on phosphorus.

EXAMPLE 17

Acrylonitrile derivative of the product of Example 15

The product from an experiment similar in all significant respects to Example 15 was reacted exothermically with acrylonitrile. The characteristic infrared absorption band of the P—H group at 3.33μ disappeared and that of the CN group appeared at 4.45μ, indicating the conversion of the P—H group to the $PCH_2CH_2CN$ group.

EXAMPLE 18

DMEA-catalyzed reaction of phosphorus with methanol and 1,2-epoxytetradecane

A mixture of 6.2 gm. of yellow phosphorus, 3 ml. of 1,2-epoxytetradecane and 0.9 gm. of N,N-dimethyl ethanolamine was heated to 60° C. Then a mixture of 6.4 gm. of methanol and 42.4 gm. of 1,2-epoxytetradecane was added dropwise over a 20-minute period at 50–70° C. During the following 20 minutes, an exothermic reaction took place with a deep red color formation. When the color faded, all phosphorus was consumed. The reaction mixture was oxidized with an excess of 30% hydrogen peroxide and then evaporated. There was obtained 50 gm. of a white semi-solid which showed surface activity when dissolved in water. The sodium salt of the semi-solid was also surface active.

EXAMPLE 19

Preparation of flame retardant rigid foams

Three organophosphorus products were prepared by potassium alkoxide catalyst as previously described.

Compound I: The reaction product of phosphorus, propylene glycol and propylene oxide; 13.1% P.

Compound II: Compound I treated with formaldehyde; 9.3% P.

Compound III: The reaction product of phosphorus, 1,2-butylene oxide and propylene glycol was air oxidized and further treated with 1,2-butylene oxide; 11.6% P.

Rigid urethane foams were prepared by the one-shot technique using the following recipe:

| | Phr. |
|---|---|
| Phosphorus compound | 20 |
| Polyol A [1] | 80 |
| Surfactant [2] | 1.5 |
| Dibutyltin dilaurate | 1.5 |
| Isocyanate [3] (about 5% excess) | 95.7 |
| Trichlorofluoromethane | 34 |

[1] An 80/20 propylene oxide/ethylene oxide adduct of a 1:1:1 phenol:aniline:formaldehyde condensation product; hydroxyl number was 320.
[2] A polysiloxane-polyoxyalkylene block copolymer.
[3] An organic polyisocyanate prepared by phosgenation of an aniline/formaldehyde condensation product having an average of about 2.5 aromatic nuclei per molecule.

The rigid foam systems were rated nonburning as shown in Table II.

TABLE II

Flammability test (ASTM D1692)

| Foam containing P-compound | I | II | III |
|---|---|---|---|
| Density, pcf | 1.73 | 1.54 | 1.73 |
| Ignition, sec | 18 | 17 | 17 |
| Extinguishment, sec | 37 | 35 | 36 |
| Extent, in | 1.0 | 1.0 | 0.9 |

EXAMPLE 20

Preparation of flame retardant cotton fabrics

Phosphorus Compound IV was prepared by treating the reaction product of phosphorus, methanol, and propylene oxide with aqueous formaldehyde, followed by air oxidation; 19.3% P. It was found to give flame retardant properties to 8 oz./sq. yd. cotton twill as shown in Table III. The flammability of the fabrics were examined by the Ellipse Flame Test [P. Hay, American Dyestuff Reporter, 53, 812–815 (1964)] and by the Vertical Flame Test [The American Association of Textile Chemists and Colorists, Standard Method 34-1952].

TABLE III

| Formulation | Wt., percent | Cured °F./min. | Fabric state [a] | Add-on, percent | Stiffness warp | Break, lbs. | Ellipse,[b] mm. | Vertical [c] Char, in. | A.F., sec. |
|---|---|---|---|---|---|---|---|---|---|
| Control | | | W | | 6.1 | 162 | BEL | BEL | 28 |
| | | | B | | 5.3 | 166 | BEL | | |
| THPC [d] | 7.0 | 300/8 | W | 7.4 | | | 5.4 | 4.8 | 0 |
| APO [e] | 7.7 | | B | | 9.8 | 132 | 14 | | |
| Triethanolamine | 1.25 | | | | | | | | |
| P-compound IV | 15.0 | 300/8 | W | 14.4 | | | 7 | 5.3 | 0 |
| Aerotex resin MW [f] | 10.0 | | B | | 7.7 | 108 | 15 | | |
| Aerotex accelerator No. 5 | 3.38 | | | | | | | | |

[a] W=Rinsed with tap water, washed (0.01% Amber Flakes) in a home laundry machine, and tumble dried; B=Boiled 3 hrs. in 0.5% Amber Flakes and 0.2% sodium carbonate.
[b] Ellipse flame test; BEL=Burned entire length.
[c] Vertical flame test; A.F.=After flaming.
[d] Tetrakis(hydroxymethyl)phosphonium chloride.
[e] Tris-1-aziridinylphosphine oxide.
[f] Modified melamine-formaldehyde condensate sold by American Cyanamid Company.

EXAMPLE 21

Oxidation and esterification of the product for Example 15

The product from an experiment similar in all significant respect to Example 15 was oxidized with air at 65° C. overnight. The reaction mixture was further treated with aqueous hydrogen peroxide to ensure the complete conversion of the trivalent phosphorus groups to the pentavalent phosphorus groups. The reaction mixture was evaporated to remove water and then treated with excess propylene oxide until the acid number of the reaction mixture was essentially zero. The final product had a phosphorus content of 15%, corresponding to an overall yield of 85% based on phosphorus.

What is claimed is:

1. Process which comprises reacting (a) elemental phosphorus, (b) an epoxide or an epithioalkane and (c) an alcohol or an alkanethiol in the presence of a catalytic quantity of a base, at a temperature within the range of from about 25° C. to about 200° C. to produce an organophosphorus composition and thereafter further reacting the organophosphorus composition with an activated olefin to add said olefin to substantially all of the P—H materials present in said organophosphorus composition and thereafter oxidizing the resultant product to convert substantially all trivalent phosphorus in said resultant product to pentavalent phosphorus.

2. Process of claim 1 wherein said olefin is acrylonitrile, acrylamide, methyl acrylate, t-butyl methacrylate, vinyl methyl ketone, or vinyl methyl sulfone.

3. The process of claim 1 wherein said olefin is acrylonitrile.

4. Process of claim 1 wherein reactant (b) is an epoxyalkane, wherein reactant (c) is selected from the group consisting of hydroxyl-substituted alkanes, alkanolamines, and hydroxyethers, and wherein the base is selected from the group consisting of alkali metal alkoxides, alkali metal hydroxides, alkaline earth metal hydroxides, alkaline earth metal alkoxides and quaternary ammonium compounds.

5. Process of claim 1 wherein reactant (b) is ethylene oxide, propylene oxide, 1,2-butylene oxide, or 1,2-epoxytetradecane, and wherein reactant (c) is propylene glycol, methanol, ethanol, propanol, butanol, dodecanol or N,N-dimethylethanolamine.

References Cited

Grayson et al.: "Topics in Phosphorus Chemistry, vol. I, J. Wiley and Sons, Inc., New York (1964), pages 2 and 4.

JOSEPH REBOLD, Primary Examiner

R. L. RAYMOND, Assistant Examiner

U.S. Cl. X.R.

260—2.5 AJ, 77.5 AR, 920, 928, 931, 940, 941, 943, 945, 946, 947, 948, 953, 962, 968, 970, 971